(12) United States Patent
Maberry et al.

(10) Patent No.: US 11,136,494 B2
(45) Date of Patent: Oct. 5, 2021

(54) POLYMER WITH INTERNAL CROSSLINKING AND BREAKING MECHANISMS

(71) Applicant: ROCKWATER ENERGY SOLUTIONS, LLC, Houston, TX (US)

(72) Inventors: Jack Maberry, Katy, TX (US); Yifan Li, Katy, TX (US); Rupa Venugopal, Katy, TX (US); Mark Kinsey, Montgomery, TX (US); Paul Pistono, The Woodlands, TX (US); Fati Malekahmadi, Houston, TX (US)

(73) Assignee: ROCKWATER ENERGY SOLUTIONS, LLC, Houston, TX (US)

( * ) Notice: Subject to any disclaimer, the term of this patent is extended or adjusted under 35 U.S.C. 154(b) by 109 days.

(21) Appl. No.: 15/611,559

(22) Filed: Jun. 1, 2017

(65) Prior Publication Data

US 2017/0349817 A1    Dec. 7, 2017

Related U.S. Application Data

(60) Provisional application No. 62/344,934, filed on Jun. 2, 2016.

(51) Int. Cl.
| | | |
|---|---|---|
| *C09K 8/80* | (2006.01) | |
| *C09K 8/68* | (2006.01) | |
| *C08F 220/54* | (2006.01) | |
| *C08K 3/10* | (2018.01) | |
| *C08L 33/24* | (2006.01) | |
| *E21B 43/267* | (2006.01) | |
| *C09K 8/70* | (2006.01) | |
| *C08F 220/18* | (2006.01) | |
| *C09K 8/90* | (2006.01) | |
| *C08K 3/08* | (2006.01) | |

(52) U.S. Cl.
CPC ............ *C09K 8/685* (2013.01); *C08F 220/18* (2013.01); *C08F 220/54* (2013.01); *C08K 3/10* (2013.01); *C08L 33/24* (2013.01); *C09K 8/706* (2013.01); *C09K 8/80* (2013.01); *C09K 8/90* (2013.01); *E21B 43/267* (2013.01); *C08K 3/08* (2013.01); *C09K 2208/20* (2013.01); *C09K 2208/22* (2013.01); *C09K 2208/26* (2013.01); *C09K 2208/28* (2013.01)

(58) Field of Classification Search
CPC ......... C08F 220/54; C08K 3/10; C08L 33/24; C09K 2208/20; C09K 2208/22; C09K 2208/26; C09K 2208/28; C09K 8/685; C09K 8/706; C09K 8/80; C09K 8/90; E21B 43/267

See application file for complete search history.

(56) References Cited

U.S. PATENT DOCUMENTS

| | | | | |
|---|---|---|---|---|
| 5,642,783 | A * | 7/1997 | Moradi-Araghi | ...... C09K 8/512 166/295 |
| 2008/0183451 | A1* | 7/2008 | Weng | ...... E21B 43/26 703/10 |
| 2010/0048430 | A1* | 2/2010 | Funkhouser | ...... C09K 8/685 507/219 |

(Continued)

*Primary Examiner* — Alicia Bland
(74) *Attorney, Agent, or Firm* — Locklar PLLC

(57) ABSTRACT

A polymer composition may include one or more monomeric units, with an internal crosslinker, internal breaker, scale control additive or a combination thereof.

15 Claims, 7 Drawing Sheets

(56) References Cited

U.S. PATENT DOCUMENTS

| | | | |
|---|---|---|---|
| 2013/0105157 A1* | 5/2013 | Barmatov | C09K 8/685 166/280.1 |
| 2014/0000890 A1* | 1/2014 | Sun | C09K 8/68 166/279 |
| 2014/0158355 A1* | 6/2014 | Wuthrich | E21B 43/16 166/294 |

* cited by examiner

POLYMER WITH INTERNAL CROSSLINKING AND BREAKING MECHANISMS

CROSS-REFERENCE TO RELATED APPLICATIONS

This application is a U.S. non-provisional application which claims priority from U.S. provisional application No. 62/344,934, filed Jun. 2, 2016, which is incorporated by reference herein in its entirety.

FIELD

Embodiments of the present disclosure generally relate to polymers that may be used in hydraulic fracturing.

BACKGROUND

Traditionally, crosslinked guar and guar derivative polymers are used in hydraulic fracturing applications, where viscous, crosslinked hydraulic fracturing fluids are pumped into a wellbore under pressure sufficient to break down portions of the subterranean geological formation surrounding the wellbore and propagate a fracture network within the subterranean geological formation. Such crosslinked fluids are traditionally capable of suspending and carrying proppant along the fracture network, creating a highly conductive proppant pack at the completion of the hydraulic fracturing treatment and subsequent subterranean geological formation closure. The increased viscosity that results from crosslinking of polymers in such crosslinked fluids allows higher loading of proppant in the hydraulic fracturing fluid to be transported into the fracture network. For example, about 8 lbs proppant/gallon hydraulic fracturing fluid may be transported into the fracture network using such fluids.

In slickwater fracturing, dilute solutions containing un-crosslinked polymer (i.e., slickwater fluids) are pumped at rates sufficient to control pipe friction pressure and effectively transport proppant along a fracture network. The concentration of proppants carried in slickwater fluids is traditionally low, such as from about 1 lb proppant/gallon slickwater fluid to about 4 lb proppant/gallon slickwater fluid. Polymers used in slickwater fluids include polyacrylamide polymers, which are used as friction reducers.

Some hydraulic fracturing applications use a combination of slickwater fluids that contain un-crosslinked polymers and crosslinked fluids that contain crosslinked polymers. For example, in some traditional applications a slickwater fluid carrying, for example, from 1 to 2 lbs of proppant per gallon of slickwater fluid, is utilized at various points in the hydraulic fracturing treatment. After use of the slickwater fluid, the hydraulic fracturing fluid is switched to a crosslinked fluid that contains crosslinked polymers, such as a fluid containing a crosslinked guar or guar derivative polymer, in order to utilize a higher proppant concentration, such as from about 3 to 8 lbs of proppant per gallon of crosslinked fluid. Such processes create intervals that are highly conductive along the fracture network.

SUMMARY

The present disclosure provides for a polymer composition including a polymer. The polymer may include monomeric units. The monomeric units may include component (A) represented by the formula:

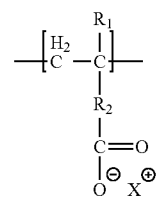

Within component (A), $R_1$ may be hydrogen, a $C_1$-$C_6$ alkyl, or a phenyl; $R_2$ may be a $C_1$-$C_{22}$ alkylene, a carboxylic $C_1$-$C_{22}$ alkylene ester, benzyl, an alkyl benzyl containing $C_1$-$C_{16}$ carbon atoms, or a benzyl amide; and X may be hydrogen, lithium, sodium, potassium, ammonium or a mixture thereof.

The monomeric units may include component (B) represented by the formula:

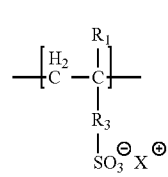

Within component (B), $R_1$ may be hydrogen, a $C_1$-$C_6$ alkyl, or a phenyl; $R_3$ may be a $C_1$-$C_{22}$ alkylene, a $C_1$-$C_{22}$ alkyl amide, a phenyl amide, a benzyl amide, a carboxylic $C_1$-$C_{22}$ alkylene ester, a phenyl, a benzyl, or a benzyl alkyl containing $C_1$-$C_{16}$ carbon atoms; and X may be hydrogen, lithium, sodium, potassium, ammonium or a mixture thereof.

The monomeric units may include component (C) represented by the formula:

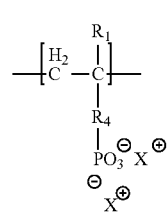

Within component (C), $R_1$ may be hydrogen, a $C_1$-$C_6$ alkyl, or a phenyl; $R_4$ may be a $C_1$-$C_{22}$ alkylene, a $C_1$-$C_{22}$ alkyl amide, a phenyl amide, a benzyl amide, a carboxylic $C_1$-$C_{22}$ alkylene ester, a phenyl, a benzyl, or a benzyl alkyl containing $C_1$-$C_{16}$ carbon atoms; and X may be hydrogen, lithium, sodium, potassium, ammonium or a mixture thereof.

The monomeric units may include component (D) represented by the formula:

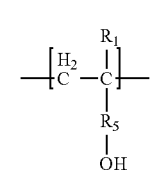

Within component (D), $R_1$ may be hydrogen, a $C_1$-$C_6$ alkyl, or a phenyl; and $R_4$ may be a $C_1$-$C_{22}$ alkylene, a $C_1$-$C_{22}$ alkyl amide, a phenyl amide, a benzyl amide, a carboxylic $C_1$-$C_{22}$ alkylene ester, a benzyl, or a benzyl alkyl containing $C_1$-$C_{16}$ carbon atoms.

The monomeric units may include component (E) represented by the formula:

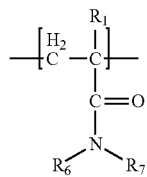

(E)

Within component (E), $R_1$ may be hydrogen, a $C_1$-$C_6$ alkyl, or a phenyl; $R_6$ may be hydrogen or an alkyl containing $C_1$-$C_{22}$ carbon atoms; and $R_7$ may be hydrogen or an alkyl containing $C_1$-$C_{22}$ carbon atoms.

The monomeric units may include component (F) represented by the formula:

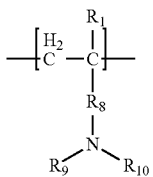

(F)

Within component (F), $R_1$ may be hydrogen, a $C_1$-$C_6$ alkyl, or a phenyl; $R_4$ may be a $C_1$-$C_{22}$ alkylene, a $C_1$-$C_{22}$ alkyl amide, a phenyl amide, a benzyl amide, a benzyl, or a benzyl alkyl containing $C_1$-$C_{16}$ carbon atoms; $R_9$ may be hydrogen or an alkyl containing $C_1$-$C_{22}$ carbon atoms; and $R_{10}$ may be hydrogen or an alkyl containing $C_1$-$C_{22}$ carbon atoms.

The monomeric units may include component (G) represented by the formula:

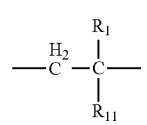

(G)

Within component (G), $R_1$ may be hydrogen, a $C_1$-$C_6$ alkyl, or a phenyl; and $R_{11}$ may be a carboxylic acid, a carboxylic salt, a sulfonic acid, a sulfonic salt, a phosphonic acid salt, an alcohol, an amine, or a nitrile.

The monomeric units may include component (H) represented by the formula:

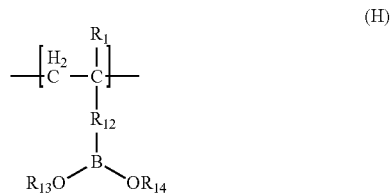

(H)

Within component (H), $R_1$ may be hydrogen, a $C_1$-$C_6$ alkyl, or a phenyl; $R_{12}$ may be a $C_1$-$C_{22}$ alkylene, a $C_1$-$C_{22}$ alkyl amide, a phenyl amide, a phenyl, a phenyl alkylamino amide, or a phenyl alkyl containing $C_1$-$C_{16}$ carbon atoms; $R_{13}$ may be hydrogen, lithium, sodium, potassium, ammonium, or a mixture thereof; and $R_{14}$ may be hydrogen, lithium, sodium, potassium, ammonium, or a mixture thereof.

The monomeric units may include any combination of components (A)-(H).

The polymer may also include an internal crosslinker, an internal breaker, a scale control additive, or a combination thereof.

The present disclosure also provides for a hydraulic fracturing fluid. The hydraulic fracturing fluid may include the polymeric composition suspended in an aqueous fluid. The polymeric composition may include the polymer, including any combination of the monomeric units (A)-(H), and an internal crosslinker, an internal breaker, a scale control additive, or a combination thereof.

The present disclosure also provides for a hydraulic fracturing method. The hydraulic fracturing method may include pumping the hydraulic fracturing fluid into a wellbore under pressure sufficient to break down portions of a subterranean geological formation surrounding the wellbore and to propagate a fracture network within the subterranean geological formation. The hydraulic fracturing fluid may include the polymeric composition suspended in an aqueous fluid, and a proppant suspended in the aqueous fluid. The polymeric composition may include the polymer, including any combination of monomeric units (A)-(H), and an internal crosslinker, an internal breaker, a scale control additive, or a combination thereof.

The disclosure also provides for a multi-functional additive suspension. The multi-functional additive suspension includes a carrier fluid, the carrier fluid including a solvent, the solvent being a mineral oil, hydrotreated mineral oil, terpene, glycol ether, polyethylene glycol, polypropylene glycol, or combinations thereof. The multi-functional additive suspension also includes a polymeric compound, the polymeric compound being a anionic polyacrylamide or a diacrylate.

BRIEF DESCRIPTION OF DRAWINGS

The present disclosure may be understood from the following detailed description when read with the accompanying figures. It is emphasized that, in accordance with the standard practice in the industry, various features may not be drawn to scale. In fact, the dimensions of the various features may be arbitrarily increased or reduced for clarity of discussion.

DETAILED DESCRIPTION

Figure 1:
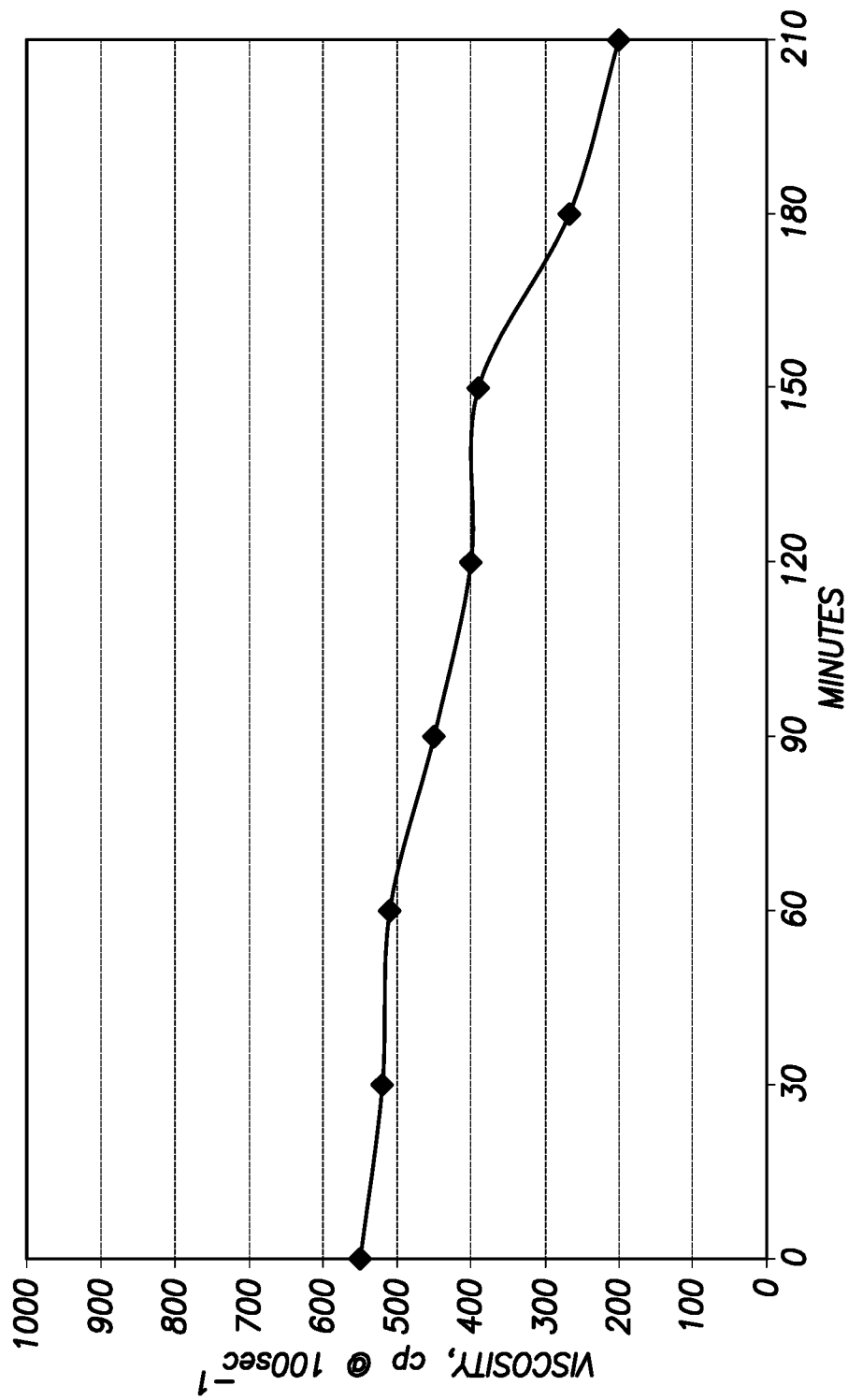
FIG. 1 is a graphical depiction of rheology of a hydraulic fracturing fluid at 125° F. using a zirconium crosslinker in accordance with Example 1.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology. In addition, the present disclosure may repeat reference numerals and/or letters in the various examples. This repetition is for the purpose of simplicity and clarity and does not in itself dictate a relationship between the various embodiments and/or configurations discussed.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Certain embodiments of the present disclosure relate to a polymer composition containing a polymer. In some embodiments, the polymer is a synthetic polymer. In some embodiments, the polymer is a copolymer containing at least two different monomeric units. In other embodiments, the polymer is a homopolymer containing only one type of monomeric unit.

In certain embodiments, the polymer includes component (A) as a monomeric unit. Component (A) is represented by the formula:

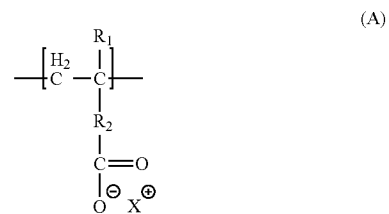

Within component (A), $R_1$ may be hydrogen, a $C_1$-$C_6$ alkyl, or a phenyl. Within component (A), $R_2$ may be a $C_1$-$C_{22}$ alkylene, a carboxylic $C_1$-$C_{22}$ alkylene ester, benzyl, an alkyl benzyl containing $C_1$-$C_{16}$ carbon atoms, or a benzyl amide. Within component (A), X may be hydrogen, lithium, sodium, potassium, ammonium or a mixture thereof.

Component (A) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (B) as a monomeric unit. Component (B) is represented by the formula:

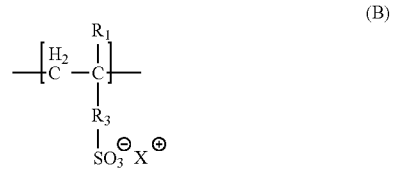

Within component (B), $R_1$ may be hydrogen, a $C_1$-$C_6$ alkyl, or a phenyl. Within component (B), $R_3$ may be a $C_1$-$C_{22}$ alkylene, a $C_1$-$C_{22}$ alkyl amide, a phenyl amide, a benzyl amide, a carboxylic $C_1$-$C_{22}$ alkylene ester, a phenyl, a benzyl, or a benzyl alkyl containing $C_1$-$C_{16}$ carbon atoms. Within component (B), X may be hydrogen, lithium, sodium, potassium, ammonium or a mixture thereof.

Component (B) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (C) as a monomeric unit. Component (C) is represented by the formula:

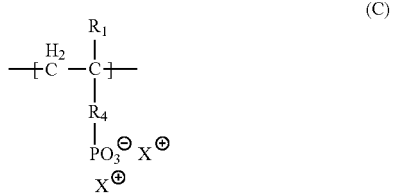

Within component (C), $R_1$ may be hydrogen, a $C_1$-$C_6$ alkyl, or a phenyl. Within component (C), $R_4$ may be a $C_1$-$C_{22}$ alkylene, a $C_1$-$C_{22}$ alkyl amide, a phenyl amide, a benzyl amide, a carboxylic $C_1$-$C_{22}$ alkylene ester, a phenyl, a benzyl, or a benzyl alkyl containing $C_1$-$C_{16}$ carbon atoms. Within component (C), X may be hydrogen, lithium, sodium, potassium, ammonium or a mixture thereof.

Component (C) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (D) as a monomeric unit. Component (D) is represented by the formula:

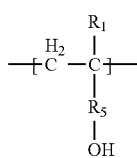

(D)

Within component (D), $R_1$ may be hydrogen, a $C_1$-$C_6$ alkyl, or a phenyl. Within component (D), $R_4$ may be a $C_1$-$C_{22}$ alkylene, a $C_1$-$C_{22}$ alkyl amide, a phenyl amide, a benzyl amide, a carboxylic $C_1$-$C_{22}$ alkylene ester, a benzyl, or a benzyl alkyl containing $C_1$-$C_{16}$ carbon atoms.

Component (D) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (E) as a monomeric unit. Component (E) is represented by the formula:

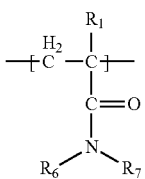

(E)

Within component (E), $R_1$ may be hydrogen, a $C_1$-$C_6$ alkyl, or a phenyl. Within component (E), $R_6$ may be hydrogen or an alkyl containing $C_1$-$C_{22}$ carbon atoms. Within component (E), $R_7$ may be hydrogen or an alkyl containing $C_1$-$C_{22}$ carbon atoms.

Component (E) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (F) as a monomeric unit. Component (F) is represented by the formula:

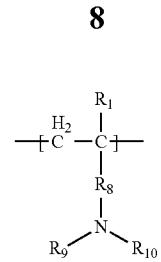

(F)

Within component (F), $R_1$ may be hydrogen, a $C_1$-$C_6$ alkyl, or a phenyl. Within component (F), $R_4$ may be a $C_1$-$C_{22}$ alkylene, a $C_1$-$C_{22}$ alkyl amide, a phenyl amide, a benzyl amide, a benzyl, or a benzyl alkyl containing $C_1$-$C_{16}$ carbon atoms. Within component (F), $R_9$ may be hydrogen or an alkyl containing $C_1$-$C_{22}$ carbon atoms. Within component (F), $R_{10}$ may be hydrogen or an alkyl containing $C_1$-$C_{22}$ carbon atoms.

Component (F) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (G) as a monomeric unit. Component (G) is represented by the formula:

(G)

Within component (G), $R_1$ may be hydrogen, a $C_1$-$C_6$ alkyl, or a phenyl. Within component (G), $R_{11}$ may be a carboxylic acid, a carboxylic salt, a sulfonic acid, a sulfonic salt, a phosphonic acid salt, an alcohol, an amine, or a nitrile. When $R_{11}$ is a carboxylic salt, $R_{11}$ may be, for example and without limitation, a lithium carboxylic salt, sodium carboxylic salt, potassium carboxylic salt, ammonium carboxylic salt, or a mixture thereof. When $R_{11}$ is a sulfonic salt, $R_{11}$ may be, for example and without limitation, a lithium sulfonic salt, sodium sulfonic salt, potassium sulfonic salt, ammonium sulfonic salt, or a mixture thereof. When $R_{11}$ is a phosphonic acid salt, $R_{11}$ may be, for example and without limitation, a lithium phosphonic acid salt, sodium phosphonic acid salt, potassium phosphonic acid salt, ammonium phosphonic acid salt, or a mixture thereof. When $R_{11}$ is an amine, $R_{11}$ may be, for example and without limitation, a primary amine, secondary amine, or tertiary amine.

Component (G) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

In certain embodiments, the polymer includes component (H) as a monomeric unit. Component (H) is represented by the formula:

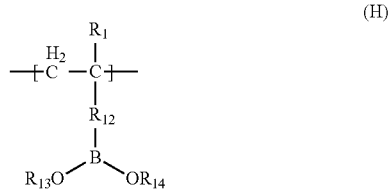

(H)

Within component (H), $R_1$ may be hydrogen, a $C_1$-$C_6$ alkyl, or a phenyl. Within component (H), $R_{12}$ may be a $C_1$-$C_{22}$ alkylene, a $C_1$-$C_{22}$ alkyl amide, a phenyl amide, a phenyl, a phenyl alkylamino amide, or a phenyl alkyl containing $C_1$-$C_{16}$ carbon atoms. Within component (H), $R_{13}$ may be hydrogen, lithium, sodium, potassium, ammonium, or a mixture thereof. Within component (H), $R_{14}$ may be hydrogen, lithium, sodium, potassium, ammonium, or a mixture thereof.

Component (H) may be present in the polymer as a monomeric unit in an amount ranging from about 0.1 to 99.9 weight percent, or 0.5 to 99.5 weight percent, or 1 to 99 weight percent, or 10 to 90 weight percent, or 20 to 80 weight percent, or 30 to 70 weight percent, or 40 to 60 weight percent, or 45 to 55 weight percent based on a total weight of the polymer.

As monomeric units, the polymer may include any one of components (A)-(H) or any combinations thereof. In some embodiments, the polymer only includes, as monomeric units, at least one of components (A)-(H) or any combinations thereof, and does not include any monomeric units other than components (A)-(H). In certain embodiments, the polymer includes each of components (A)-(H) as monomeric units. In some embodiments, the polymer only includes each of components (A)-(H) as monomeric units, and does not include any monomeric units other than components (A)-(H).

In some embodiments, the polymer composition includes a crosslinker. In some embodiments, the crosslinker is an internal crosslinker, wherein the polymer contains the crosslinker. As used herein, the term "internal crosslinker" refers to a crosslinker that is either chemically bonded with the polymer during manufacturing or directly combined with the polymer in the polymer composition prior to any addition of the polymer composition to an aqueous fluid to form a hydraulic fracturing fluid. When the internal crosslinker is chemically bonded with the polymer during manufacturing, the internal crosslinker may be added before a water phase preparation operation and before the polymerization. Without being bound by theory, the internal crosslinker is reacted with monomers in-situ during the polymerization as a reactant; therefore, the crosslinked polymer is formed during the polymerization reaction.

In some embodiments, the internal crosslinker in the polymer composition becomes chemically bonded with the polymer upon addition of the polymer composition to aqueous fluid. In these embodiments, the internal crosslinker does not participate in the polymerization process. Instead, the internal crosslinker is added after the polymerization and the cross-linked structure is formed after the polymerization reaction.

For example and without limitation, when the polymer contains component (A), the internal crosslinker may be chemically bonded to the O that forms a single bond with the C; when the polymer contains component (B), the internal crosslinker may be chemically bonded to the $SO_3$ group; when the polymer contains component (C), the internal crosslinker may be chemically bonded to the $PO_3$ group; when the polymer contains component (D), the internal crosslinker may be chemically bonded to the O of the OH group; when the polymer contains component (G), the internal crosslinker may be chemically bonded to the $R_5$ group; and when the polymer contains component (H), the internal crosslinker may be chemically bonded to the B.

In some embodiments, the polymer composition contains from 0.5 to 60 weight percent internal crosslinker, or from 1 to 50 weight percent internal crosslinker, or from 5 to 40 weight percent internal crosslinker, or from 10 to 30 weight percent internal crosslinker, or from 15 to 25 weight percent internal crosslinker, based on a total weight of the polymer composition. In some embodiments, the internal crosslinker may be a metal or may contain a metal. For example and without limitation, the internal crosslinker may be zirconium, borate, boron, a polymeric boron compound, titanium, aluminum, iron (e.g., iron (III)), chromium (e.g., chromium (III) or chromium (VI)), or hafnium. In some embodiments, the internal crosslinker may be an alcohol, such as a di, tri, or tetra-functional alcohol or a polymeric alcohol. In some embodiments, the internal crosslinker may be an amine, such as a di, tri, or tetra-functional amine or a polymeric amine. In some embodiments, the internal crosslinker may be chemically bonded with the polymer during manufacturing or prior to polymer addition to water.

In certain embodiments, the polymer composition includes a breaker. In some embodiments, the breaker is an internal breaker, where the polymer contains the breaker. As used herein, the term "internal breaker" refers to a breaker that is either chemically bonded with the polymer or directly combined with the polymer in the polymer composition prior to any addition of the polymer composition to an aqueous fluid to form a hydraulic fracturing fluid. In some embodiments, the internal breaker in the polymer composition becomes chemically bonded with the polymer upon addition of the polymer composition to aqueous fluid. For example and without limitation, when the polymer contains component (A), the internal breaker may be chemically bonded to the O that forms a single bond with the C; when the polymer contains component (B), the internal breaker may be chemically bonded to the $SO_3$ group; when the polymer contains component (C), the internal breaker may be chemically bonded to the $PO_3$ group; when the polymer contains component (D), the internal breaker may be chemically bonded to the O of the OH group; when the polymer contains component (G), the internal breaker may be chemically bonded to the $R_{11}$ group; and when the polymer contains component (H), the internal breaker may be chemically bonded to the B.

In some embodiments, the polymer composition contains from 0.05 to 30 weight percent internal breaker, or from 0.1 to 20 weight percent internal breaker, or from 1 to 15 weight percent internal breaker, or from 2 to 10 weight percent internal breaker, or from 5 to 7 weight percent internal breaker, based on the total weight of the polymer composition. In some embodiments, the breaker may be an oxidizing breaker. For example and without limitation, the breaker may be an inorganic peroxide, an organic peroxide, a bromate, a persulfate, a nitrate, an acid, or a base. For example and without limitation, the breaker may be citric acid, fumaric acid, KOH, NaOH, or LiOH. In operation, in some embodiments, the breaker may promote proppant pack cleanup by breaking down portions of the proppant pack within the fracture network formed by hydraulic fracturing, thereby, improving the conductivity of gas and/or liquids through the fracture network.

In some embodiments, the breaker may be modified in order to inhibit release and/or activity of the breaker. For example and without limitation, the breaker may be encapsulated or granulated.

In some embodiments, the polymer composition includes one or more scale control additives. In some embodiments, the polymer composition contains from 0.05 to 30 weight percent scale control additives, or from 0.1 to 20 weight percent scale control additives, or from 1 to 15 weight percent scale control additives, or from 2 to 10 weight percent scale control additives, or from 5 to 7 weight percent scale control additives, based on the total weight of the polymer composition. In certain embodiments, the scale control additives may be incorporated in the polymer. For example and without limitation, the scale control additives may include polydiallyldimethylammonium chloride (polydadmac), diallyldimethylammonium chloride (dadmac), a phosphonate, or an acrylate.

Certain embodiments of the present disclosure relate to a hydraulic fracturing fluid containing the polymer composition and an aqueous fluid. The aqueous fluid may be water. In certain embodiments, the polymer having the internal crosslinker and optionally the internal breaker is added to the aqueous fluid to form the hydraulic fracturing fluid. In some embodiments, the hydraulic fracturing fluid only contains one or more polymers that include one or more of components (A)-(H) as monomeric units, and does not contain any additional polymers that do not include components (A)-(H) as monomeric units. In other embodiments, the hydraulic fracturing fluid contains one or more polymers that include one or more of components (A)-(H) as monomeric units, and also contains additional polymers that do not include components (A)-(H) as monomeric units.

In certain embodiments, the hydraulic fracturing fluid contains an external crosslinker. As used herein the term "external crosslinker" refers to a crosslinker that is added to the hydraulic fracturing fluid separately from the polymer. In some embodiments, the polymer composition contains from 0.5 to 60 weight percent of the external crosslinker, or from 1 to 50 weight percent of the external crosslinker, or from 5 to 40 weight percent of the external crosslinker, or from 10 to 30 weight percent of the external crosslinker, or from 15 to 25 weight percent of the external crosslinker, based on the total weight of the polymer composition. In certain embodiments, use of the external crosslinker in addition to the internal crosslinker provides additional crosslinker that may not be included internally within the polymer. The composition of the external crosslinker and the amount of the external crosslinker added to the hydraulic fracturing fluid may each be selected to control crosslinking rate or stability of the hydraulic fracturing fluid, for example. In some embodiments, the external crosslinker may be a metal or may contain a metal. For example and without limitation, the external crosslinker may be zirconium, borate, boron, a polymeric boron compound, titanium, aluminum, iron (e.g., iron (III)), chromium (e.g., chromium (III) or chromium (VI)), or hafnium. In some embodiments, the external crosslinker may be an alcohol, such as a di, tri, or tetra-functional alcohol or a polymeric alcohol. In some embodiments, the external crosslinker may be an amine, such as a di, tri, or tetra-functional amine or a polymeric amine. In some embodiments, the internal crosslinker and the external crosslinker are the same. In some embodiments, the internal crosslinker and the external crosslinker are different. In other embodiments, the hydraulic fracturing fluid does not contain an external crosslinker.

In some embodiments, the hydraulic fracturing fluid contains an external breaker. As used herein, the term "external breaker" refers to a breaker added to the hydraulic fracturing fluid separately from the polymer composition. In some embodiments, the polymer composition contains from 0.05 to 30 weight percent of the external breaker, or from 0.1 to 20 weight percent of the external breaker, or from 1 to 15 weight percent of the external breaker, or from 2 to 10 weight percent of the external breaker, or from 5 to 7 weight percent of the external breaker, based on the total weight of the polymer composition. In certain embodiments, the polymer containing an internal breaker is provided and an external breaker is provided separately from the polymer containing the internal breaker. In operation, providing both an internal breaker and an external breaker provides additional breaker that is not contained within the polymer. For example and without limitation, the polymer may contain an internal breaker, such as an organic peroxide that will decompose more slowly in the proppant pack, and the external breaker may be different than the internal breaker, such as a persulfate that may provide a more rapid break down of the subterranean geological formation. In some embodiments, the external breaker may be an oxidizing breaker. For example and without limitation, the external breaker may be an inorganic peroxide, an organic peroxide, a bromate, a persulfate, a nitrate, an acid, or a base. In operation, in some embodiments, the external breaker may promote proppant pack cleanup and improve fracture conductivity of gas and/or liquid. In some embodiments, the internal breaker and the external breaker are the same. In some embodiments, the internal breaker and the external breaker are different. In some embodiments, the external breaker may be modified in order to inhibit release and/or activity of the external breaker. For example and without limitation, the external breaker may be encapsulated or granulated. In other embodiments, the hydraulic fracturing fluid does not contain an external breaker.

In certain embodiments, the hydraulic fracturing fluid may contain a crosslinked guar polymer, a crosslinked guar derivative polymer, a crosslinked cellulose polymer, a crosslinked cellulose derivative polymer, or combinations thereof. For example and without limitation, the hydraulic fracturing fluid may contain a polyacrylamide, a carboxylmethyl cellulose, or a carboxylmethyl hydroxylpropyl guar. Other examples of guar derivative polymers suitable for use herein include, but are not limited to, hydroxyethylguar, hydroxypropylguar, carboxymethylguar, and carboxymethylhydroxyethylguar. In other embodiments, the hydraulic fracturing fluid does not contain one or more of a crosslinked guar polymer, a crosslinked guar derivative polymer, a crosslinked cellulose polymer, or a crosslinked cellulose derivative polymer.

In some embodiments, the hydraulic fracturing fluid may contain one or more salts, buffers, clay stabilizers, polymer stabilizers, surfactants, non-emulsifiers, de-foamers, foamers, friction reducers, biocides, oxygen scavengers, or combinations thereof.

In some embodiments, the hydraulic fracturing fluid contains a proppant. The proppant may be particles. For example and without limitation, the proppant may be sand, resin-coated sand, or ceramic particles, such as sintered bauxite. The proppant may be suspended in the aqueous fluid of the hydraulic fracturing fluid. In certain embodiments, the hydraulic fracturing fluid may contain from 0.5 pounds (lb) of proppant per gallon (gal) of hydraulic fracturing fluid to 10 lb of proppant per gal of hydraulic fracturing fluid, or 1 lb of proppant per gal of hydraulic fracturing fluid to 9 lb of proppant per gal of hydraulic fracturing fluid, or 2 lb of proppant per gal of hydraulic fracturing fluid to 8 lb of proppant per gal of hydraulic fracturing fluid, or 3 lb of proppant per gal of hydraulic fracturing fluid to 7 lb of proppant per gal of hydraulic fracturing fluid, or 4 lb of proppant per gal of hydraulic fracturing fluid to 6 lb of proppant per gal of hydraulic fracturing fluid. In operation, the proppant may be pumped into the wellbore and subterranean geological formation while suspended within aqueous fluid. After the fracture network is formed, the proppant may remain within the fractures of the fracture network within the subterranean geological formation. Thus, the proppant may hold the fractures in the subterranean geological formation open after the hydraulic fracturing has occurred.

In certain embodiments, the hydraulic fracturing fluid exhibits improved proppant suspension characteristics as compared to slickwater fluids that do not contain polymers having internal crosslinkers and/or internal breakers, and that require external crosslinkers and/or external breakers to be added to the hydraulic fracturing fluid separately from the polymer.

Certain embodiments of the present disclosure relate to a hydraulic fracturing method that includes pumping the hydraulic fracturing fluid into a wellbore under pressure sufficient to break down portions of a subterranean geological formation surrounding the wellbore and to propagate a fracture network within the subterranean geological formation.

In some embodiments of the hydraulic fracturing method, the hydraulic fracturing fluid containing the polymer may be used as an alternative to hydraulic fracturing fluids containing polymers that do not contain internal crosslinkers and/or internal breakers, and that require external crosslinkers and/or external breakers to be added to the hydraulic fracturing fluid separately from the polymer.

In some embodiments, the hydraulic fracturing method includes using the hydraulic fracturing fluid containing the polymer as a slickwater (i.e., non-crosslinked) fluid. In other embodiments, the hydraulic fracturing method includes using the hydraulic fracturing fluid containing the polymer as a crosslinked fluid. In certain embodiments, the hydraulic fracturing method includes alternating use of the hydraulic fracturing fluid containing the polymer as a slickwater fluid and as a crosslinked fluid during different stages of the hydraulic fracturing method.

When using the hydraulic fracturing fluid as a slickwater fluid in the hydraulic fracturing method, the hydraulic fracturing fluid may contain from 0.5 to 2 $gal_{polymer}/Mgal_{aqueous\ fluid}$, or from 1 to 1.5 $gal_{polymer}/Mgal_{aqueous\ fluid}$, wherein Mgal refers to thousand gallons. Also, when using the hydraulic fracturing fluid as a slickwater fluid in the hydraulic fracturing method, the hydraulic fracturing fluid may contain less than 2 $lb_{proppant}/gal_{hydraulic\ fracturing\ fluid}$, or from 0.5 to 1.5 $lb_{proppant}/gal_{hydraulic\ fracturing\ fluid}$, or from 0.75 to 1 $lb_{proppant}/gal_{hydraulic\ fracturing\ fluid}$.

When using the hydraulic fracturing fluid as a crosslinked fluid in the hydraulic fracturing method, the hydraulic fracturing fluid may contain greater than 0.25 $gal_{polymer}/Mgal_{aqueous\ fluid}$, greater than 2 $gal_{polymer}/Mgal_{aqueous\ fluid}$, or from 0.25 $gal_{polymer}/Mgal_{aqueous\ fluid}$ to 20 $gal_{polymer}/Mgal_{aqueous\ fluid}$, or from 1 to 10 $gal_{polymer}/Mgal_{aqueous\ fluid}$, or from 2 to 5 $gal_{polymer}/Mgal_{aqueous\ fluid}$, or from 3 to 4 $gal_{polymer}/Mgal_{aqueous\ fluid}$. When using the hydraulic fracturing fluid as a crosslinked fluid in the hydraulic fracturing method, the hydraulic fracturing fluid may contain higher concentrations of the polymer than slickwater fluid, which allows the hydraulic fracturing fluid to carry more proppant, improving conductivity and/or flow potential of gas and/or liquid through the propped fracture network. For example, when using the hydraulic fracturing fluid as a crosslinked fluid in the hydraulic fracturing method, the hydraulic fracturing fluid may contain from 2 $lb_{proppant}/gal_{hydraulic\ fracturing\ fluid}$ to 10 $lb_{proppant}/gal_{hydraulic\ fracturing\ fluid}$, or from 2 $lb_{proppant}/gal_{hydraulic\ fracturing\ fluid}$ to 8 $lb_{proppant}/gal_{hydraulic\ fracturing\ fluid}$, or from 4 $lb_{proppant}/gal_{hydraulic\ fracturing\ fluid}$ to 6 $lb_{proppant}/gal_{hydraulic\ fracturing\ fluid}$.

By alternating between slickwater fluid stages and crosslinked fluid stages during the hydraulic fracturing method, overall fluid costs may be lowered. For example, by using the same polymer (i.e., the polymer having the internal crosslinker) to make slickwater fluid and crosslinked fluid, additional equipment on site to mix and provide hydration residence time, such as for a guar or guar derivative polymer, to make the crosslinked fluid may be eliminated.

In some embodiments, by alternating between slickwater fluid stages and crosslinked fluid stages during the hydraulic fracturing method, fracture conductivity of gas and/or liquid may be improved. For example and without limitation, crosslinked fluid stages may carry more proppant, which may increase the volume of propped fracture. In some embodiments, a hybrid slickwater fluid/crosslinked fluid stage is used during the hydraulic fracturing method, where a combination of slickwater fluid and crosslinked fluid is used as a hybrid hydraulic fracturing fluid.

Certain embodiments of the present disclosure are directed to a multi-functional additive suspension. The multi-functional additive suspension may be, for example and without limitation, a non-aqueous solvent suspension having multi-functional additives and a limited solubility solvent carrier fluid with multi-functional additives. The multi-functional additive suspension includes a carrier fluid including a solvent, where the solvent may include, for example, mineral oils, hydrotreated mineral oils, synthetic oils, terpenes, glycol ethers, polyethylene and polypropylene glycols, and combinations thereof. In some embodiments, a carrier fluid may includes between 30% and 70% terpenes, 10% and 30% polyethylene glycol, and 20% and 40% glycol ether, all percentages in weight percent. Terpenes may function as solvents for paraffins, while polyethylene glycol and glycol ether may function as a shale stabilizer. The carrier fluid component of the multi-functional additive suspension may be from 30% to 80% or from 45% to 70% by weight of the total multi-functional additive suspension.

The multi-functional additive suspension also includes a polymeric compound. The polymeric compound may be a crosslinker. The polymeric compound may be an anionic polyacrylamide or a diacrylate. An example of an anionic polyacrylamide is N,N methylenebis(acrylamide). An example of a diacrylate is tetra(ethylene glycol) diacrylate. The polymeric compound may be present in the multi-functional additive suspension in an amount between 5% and 70%, or between 30% and 55% of the multi-functional additive suspension by weight.

The multi-functional additive suspension may also include clay or shale stabilizers, surfactants, demulsifiers, paraffin solvents or inhibitors, scale inhibitors, and polymer breakers.

In certain embodiments, the multi-functional additive suspension may include solvent viscosity building and stabilizing additives, including clays, treated clays, and hydrocarbon-viscosifying polymers. Examples of hydrocarbon viscosifying polymers include, but are not limited to carboxymethyl cellulose, guar, and guar derivatives.

In certain embodiments, the multi-functional additive suspension may be combined with a hydraulic fracturing fluid. In other embodiments, the multi-functional additive suspension may be pumped into a formation separate from the hydraulic fracturing fluid.

EXAMPLES

The disclosure having been generally described, the following examples show particular embodiments of the disclosure. It is understood that the example is given by way of illustration and is not intended to limit the specification or the claims. All compositions percentages given in the examples are by weight.

Example 1

A polymer having components (A) and (E) as monomeric units within an aqueous fluid in accordance with an embodiment of this disclosure was provided. The polymer contained zirconium as an internal crosslinker. The polymer in the aqueous fluid was subjected to viscosity measurements at 125° F. FIG. 1 is a graphical depiction of the results of this viscosity measurement, plotting viscosity, cp @ 100 sec$^{-1}$, versus time (minutes). The viscosity was determined on a Grace M5600 HTHP Viscometer using ISO 13503-1 (2003 Sep. 1), Part 1: Measurement of Viscous Properties of Completion Fluids.

Example 2

Figure 2:
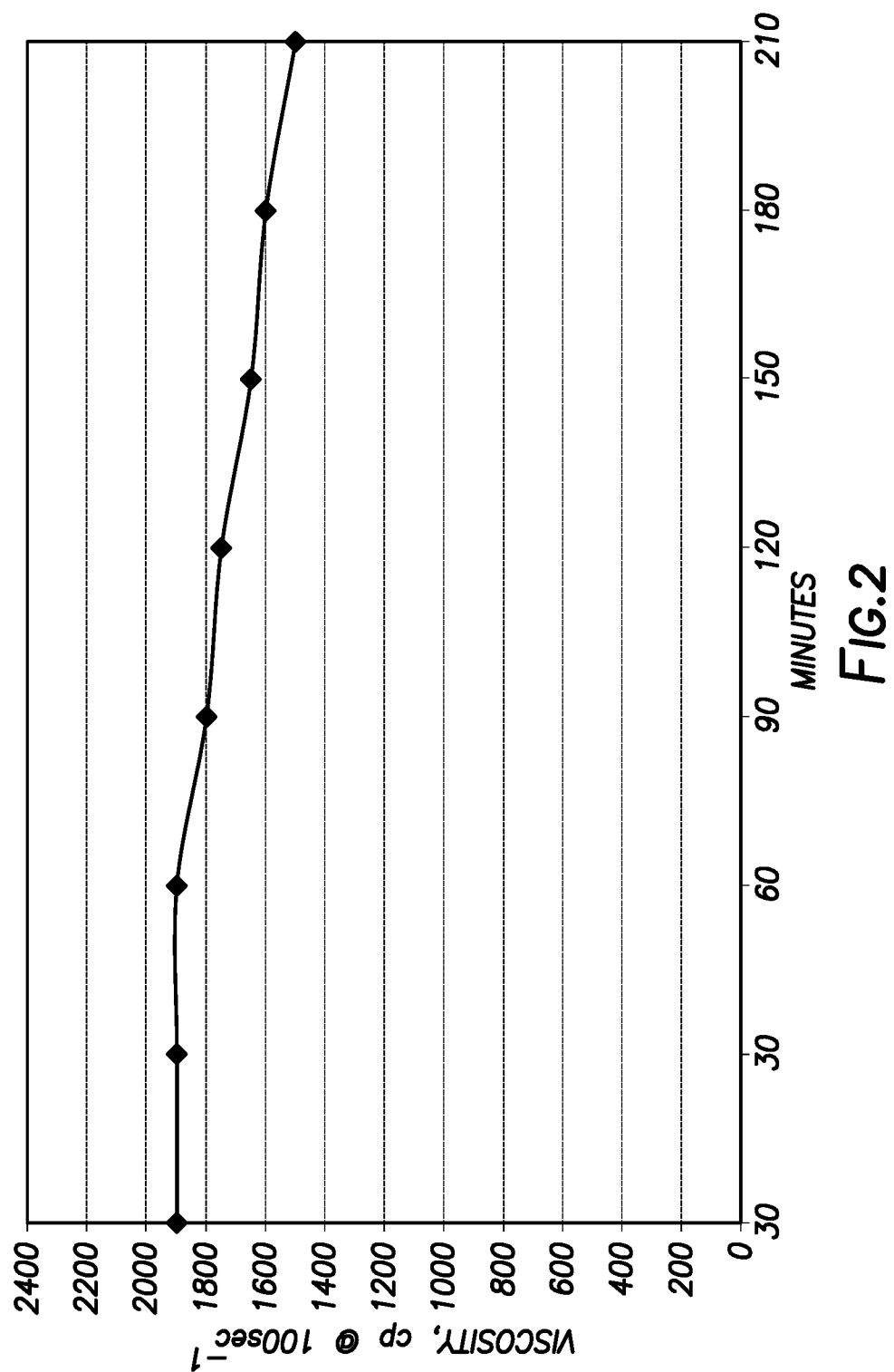
FIG. 2 is a graphical depiction of rheology of a hydraulic fracturing fluid at 150° F. using a zirconium crosslinker in accordance with Example 2.

The polymer in the aqueous fluid of Example 1, having zirconium as the internal crosslinker, was subjected to viscosity measurements at 150° F. FIG. 2 is a graphical depiction of the results of this viscosity measurement, plotting viscosity, cp @ 100 sec$^{-1}$, versus time (minutes). The viscosity was determined on a Grace M5600 HTHP Viscometer using ISO 13503-1 (2003 Sep. 1), Part 1: Measurement of Viscous Properties of Completion Fluids.

Example 3

A multi-functional additive suspension was blended. Components of the carrier fluid are reflected in Table 3.

TABLE 3

| Component | wt % |
| --- | --- |
| Carrier solvent | 51.8 |
| Viscosifying agent | 1.7 |
| Anionic polyacrylamide | 31 |
| Surfactant | 0.5 |
| Carboxymethyl cellulose | 15 |
| Total | 100 |

Example 4

Figure 3:
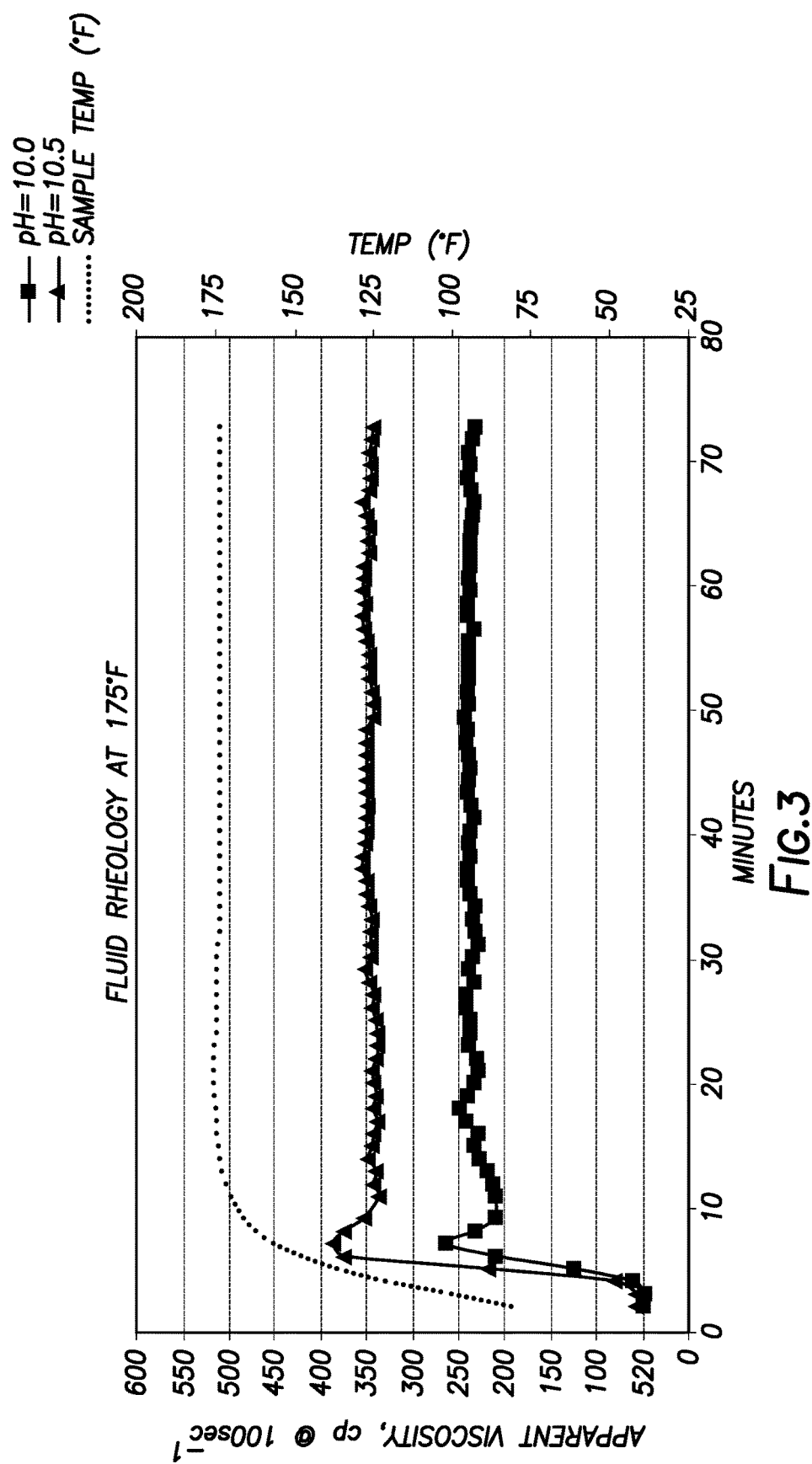
FIG. 3 is a graphical depiction of a rheology of a multi-functional additive suspension in fluid at 175° F. using a zirconium crosslinker in accordance with Example 4.

The multi-functional additive suspension of Example 3 was combined with deionized water in an amount of six gallons of multi-functional additive solution per thousand gallons of deionized water (6 gpt). A zirconium crosslinker was added to the deionized water at 3 gpt. A 25% NaOH solution was added to adjust the pH as indicated in FIG. 3. FIG. 3 is a graphical depiction of the results of this viscosity measurement, plotting viscosity, cp @ 100 sec$^{-1}$, versus time (minutes). The viscosity was determined on a Grace M5600 HTHP Viscometer using ISO 13503-1 (2003 Sep. 1), Part 1: Measurement of Viscous Properties of Completion Fluids.

Example 5

Figure 4:
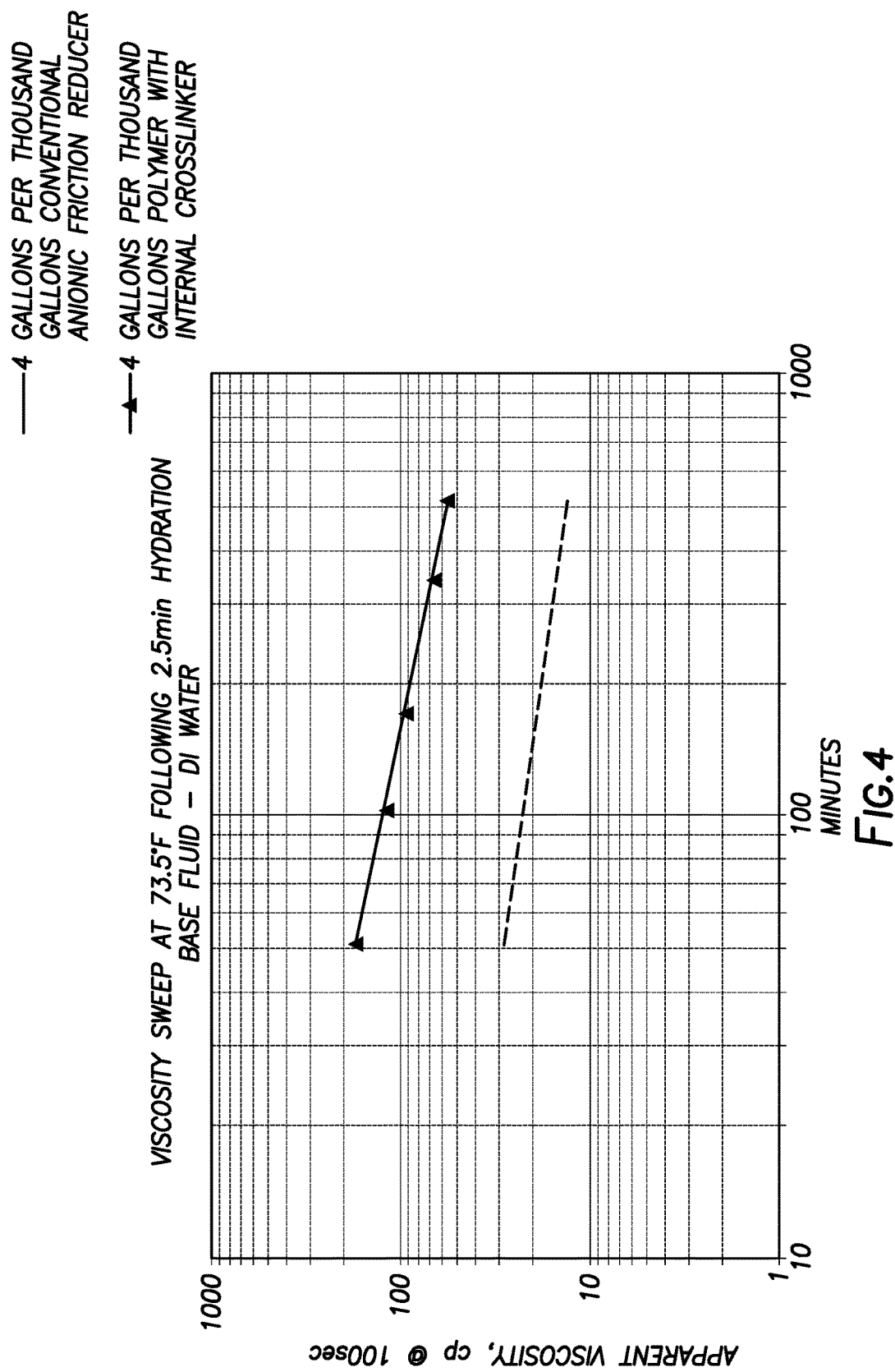
FIG. 4 is a graphical representation of a viscosity sweep of a multi-functional additive suspension at 73.5° F. in accordance with Example 5.

A multi-functional additive suspension in accordance with Example 3 was prepared, with N,N methylenebis (acrylamide) used as the anionic polyacrylamide and combined with deionized water at 4 gpt. The viscosity compared to shear rate of the multi-functional additive suspension was compared to a convention anionic friction reducer as shown in FIG. 4.

Example 6

Figure 5:
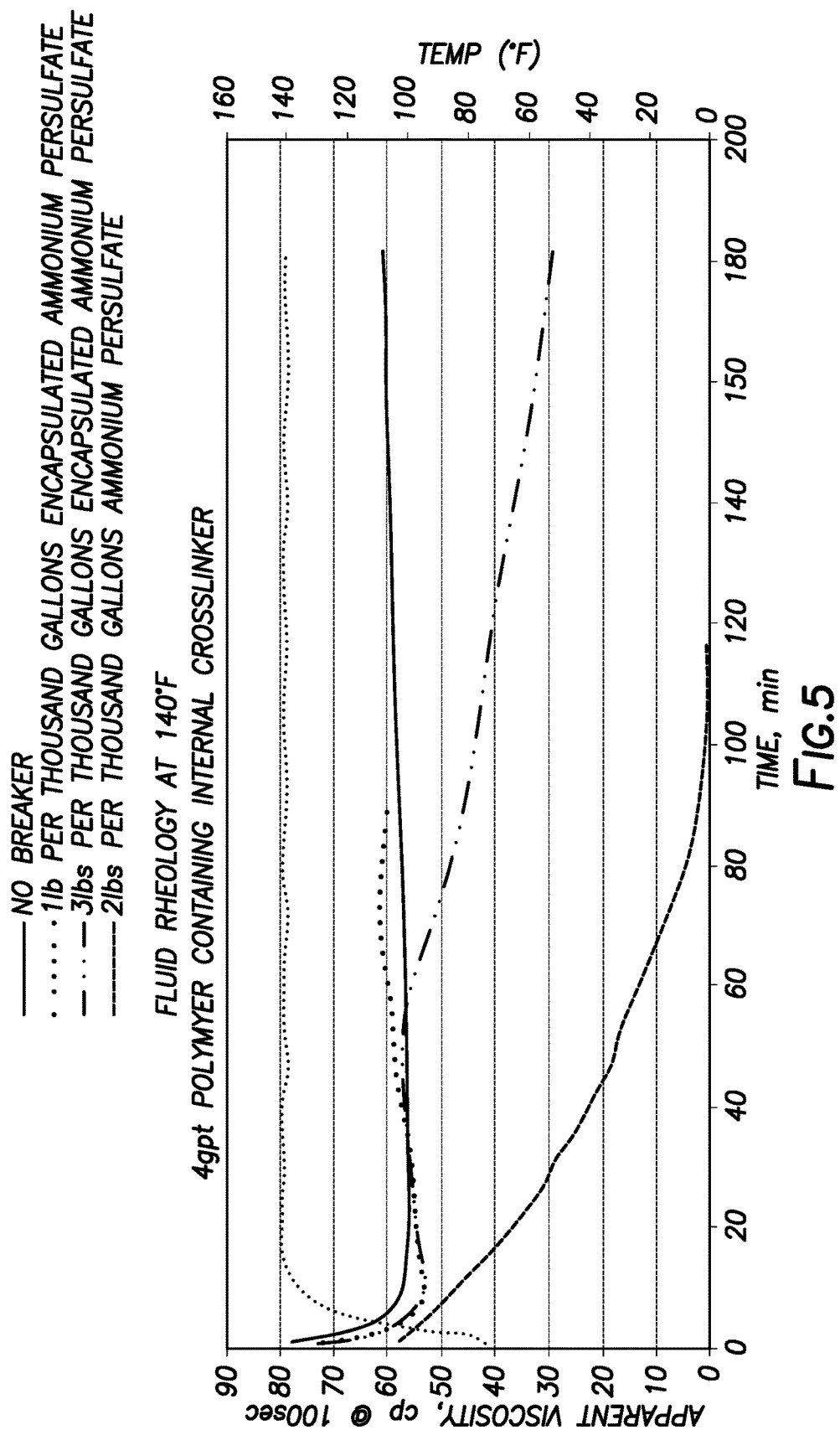
FIG. 5 is a graphical representation of a rheology of a multi-functional additive suspension in fluid at 140° F. using internal crosslinkers and breakers in accordance with Example 6.

A multi-functional additive suspension in accordance with Example 3 was prepared, with N,N methylenebis (acrylamide) used as the anionic polyacrylamide and combined with distilled water at 4 gpt. Three different samples were prepared and combined with different breakers, as shown in FIG. 5. FIG. 5 is a graphical depiction of the results of this viscosity measurement, plotting apparent viscosity, cp @ 100 sec$^{-1}$, versus time (minutes). The viscosity was determined on a Grace M5600 HTHP Viscometer using ISO 13503-1 (2003 Sep. 1), Part 1: Measurement of Viscous Properties of Completion Fluids.

Example 7

Figure 6:
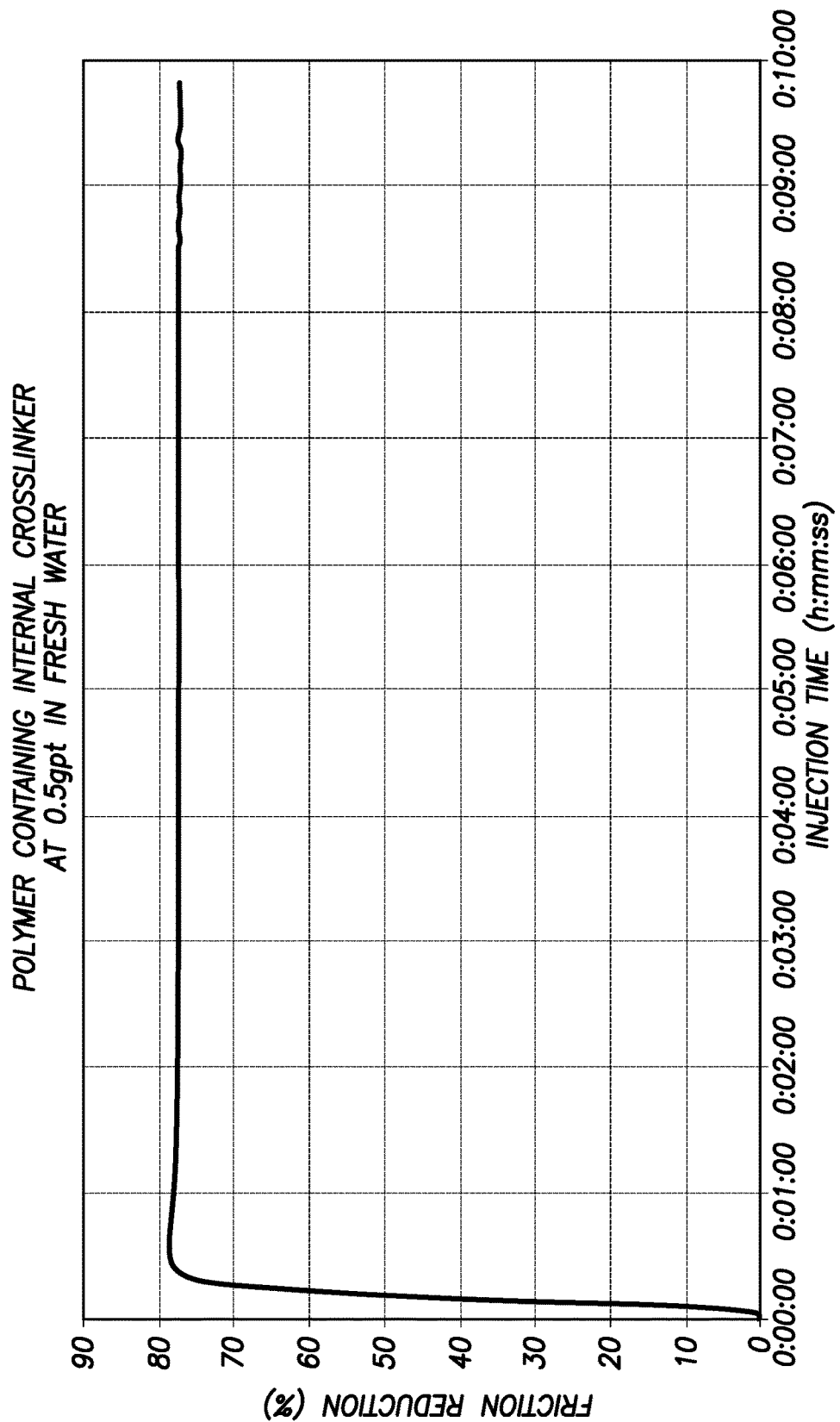
FIG. 6 is a graphical representation of the friction reduction of a multi-functional additive suspension in fluid in accordance with Example 7.

A multi-functional additive suspension in accordance with Example 3 was prepared, with N,N methylenebis (acrylamide) used as the anionic polyacrylamide and combined with fresh water at 4 gpt. Friction reduction in percent was compared to injection time, as shown in FIG. 6.

Example 8

Figure 7:
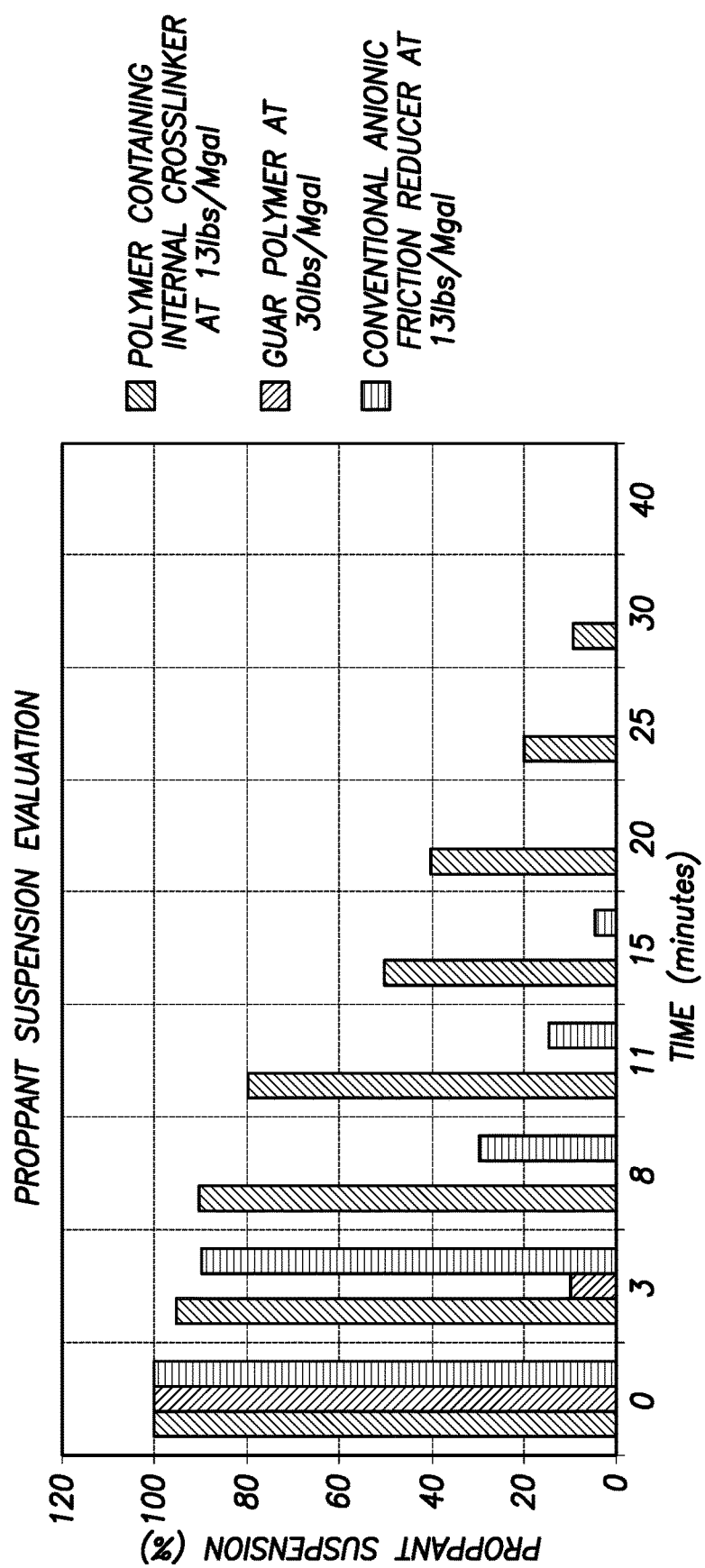
FIG. 7 is a graphical representation of a proppant suspension evaluation of a multi-functional additive suspension in fluid in accordance with Example 8.

A multi-functional additive suspension in accordance with Example 3 was prepared, with N,N methylenebis (acrylamide) used as the anionic polyacrylamide and combined with fresh water at 13 lbs/Mgal. The multi-functional additive suspension was compared with guar polymer at 30 lbs/Mgal and a conventional anionic friction reducer at 13 lbs/Mgal over time. Results of the example are shown in FIG. 7 using sand as a proppant.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A hydraulic fracturing method comprising:
    pumping a hydraulic fracturing fluid into a wellbore under pressure sufficient to break down portions of a subterranean geological formation surrounding the wellbore and to propagate a fracture network within the subterranean geological formation;
wherein the hydraulic fracturing fluid comprises a polymeric composition suspended in an aqueous fluid, and a proppant suspended in the aqueous fluid;
wherein the polymeric composition comprises a cross-linked copolymer comprising monomeric units, wherein the monomeric units comprise:
component (B) represented by the formula:

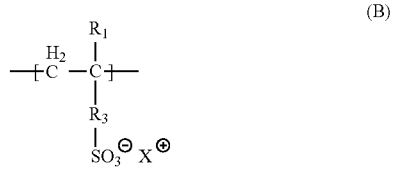

(B)

wherein within component (B), $R_1$ is hydrogen or a $C_1$-$C_6$ alkyl; $R_3$ is a $C_1$-$C_{22}$ alkylene, and X is hydrogen, lithium, sodium, potassium, ammonium or a mixture thereof
component (E) represented by the formula:

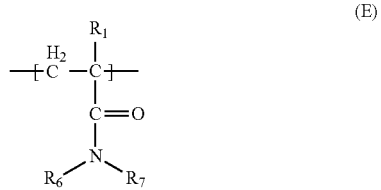

(E)

wherein within component (E), $R_1$ is hydrogen or a $C_1$-$C_6$ alkyl; $R_6$ is hydrogen or an alkyl containing $C_1$-$C_{22}$ carbon atoms; and $R_7$ is hydrogen or an alkyl containing $C_1$-$C_{22}$ carbon atoms and
component (G) represented by the formula:

(G)

wherein within component (G), $R_1$ is hydrogen, or a $C_1$-$C_6$ alkyl; and $R_{11}$ is a carboxylic acid or a carboxylic salt; and
wherein the copolymer is cross-linked with a cross-linker that is a metal or contains a metal selected from the group consisting of zirconium, titanium, aluminum, iron, chromium, or hafnium.

2. The hydraulic fracturing method of claim 1, wherein the hydraulic fracturing fluid comprises from 0.5 lb proppant/gal hydraulic fracturing fluid to 10 lb proppant/gal hydraulic fracturing fluid.

3. The hydraulic fracturing method of claim 1, wherein pumping the hydraulic fracturing fluid into the wellbore comprises alternating between:

pumping the hydraulic fracturing fluid into the wellbore as a slickwater fluid, wherein the hydraulic fracturing fluid comprises from 0.5 to 2 gal copolymer/Mgal aqueous fluid and less than 2 proppant/gal hydraulic fracturing fluid; and
pumping the hydraulic fracturing fluid into the wellbore as a crosslinked fluid, wherein the hydraulic fracturing fluid comprises greater than 0.25 gal copolymer/Mgal aqueous fluid and from 2 lb proppant/gal hydraulic fracturing fluid to 10 lb proppant/gal hydraulic fracturing fluid.

4. The hydraulic fracturing method of claim 1, wherein the hydraulic fracturing fluid is a hybrid hydraulic fracturing fluid comprising:
a slickwater fluid comprising from 0.5 to 2 gal copolymer/Mgal aqueous fluid and less than 2 lb proppant/gal hydraulic fracturing fluid; or
a crosslinked fluid comprising greater than 0.25 gal copolymer/Mgal aqueous fluid and from 2 lb proppant/gal hydraulic fracturing fluid to 10 lb proppant/gal hydraulic fracturing fluid.

5. The hydraulic fracturing method of claim 1, wherein the hydraulic fracturing fluid comprises an external breaker.

6. The hydraulic fracturing method of claim 5, wherein:
the external breaker comprises an oxidizing internal breaker.

7. The hydraulic fracturing method of claim 5, wherein:
the external breaker comprises an inorganic peroxide, an organic peroxide, a bromate, a persulfate, a nitrate, an acid, or a base.

8. The hydraulic fracturing method of claim 5, wherein:
the external breaker is encapsulated or granulated.

9. The hydraulic fracturing method of claim 5, wherein:
the external breaker is present in an amount ranging from 0.05 to 30 weight percent based on the total weight of the polymer composition.

10. The hydraulic fracturing method of claim 1, wherein the hydraulic fracturing fluid further comprises a scale control additive, wherein the scale control additive comprises polydiallyldimethylammonium chloride, diallyldimethylammonium chloride, a phosphonate, or an acrylate.

11. The hydraulic fracturing method of claim 1, wherein the hydraulic fracturing fluid comprises a crosslinked guar polymer, a crosslinked guar derivative polymer, a crosslinked cellulose polymer, a crosslinked cellulose derivative polymer, or combinations thereof.

12. The hydraulic fracturing method of claim 1, wherein the hydraulic fracturing fluid comprises one or more salts, buffers, clay stabilizers, polymer stabilizers, surfactants, non-emulsifiers, de-foamers, foamers, friction reducers, biocides, oxygen scavengers, or combinations thereof.

13. The hydraulic fracturing method of claim 1, wherein for component (E):
$R_1$, $R_6$, and $R_7$ are hydrogen.

14. The hydraulic fracturing method of claim 13, wherein for component (G):
$R_1$ is hydrogen; and
$R_{11}$ is a carboxylic acid or a carboxylic salt.

15. The hydraulic fracturing method of claim 1, wherein the polymeric composition comprises poly(acrylamide-co-sodium acrylate-co-acrylamidomethylpropane sodium sulfonate) terpolymer with a zirconium cross-linker.

* * * * *